(12) United States Patent
Smith et al.

(10) Patent No.: US 7,829,223 B1
(45) Date of Patent: Nov. 9, 2010

(54) PROCESS FOR PREPARING LITHIUM ION CATHODE MATERIAL

(76) Inventors: W. Novis Smith, 412 S. Perth St., Philadelphia, PA (US) 19147; Joseph B. Kejha, 1022 Frederick Rd., Meadowbrook, PA (US) 19046; James J. Gormley, 2822 Lincoln Ave., Ardsley, PA (US) 19038; Joel R. McCloskey, 1930 Pemberton St., Philadelphia, PA (US) 19146

( * ) Notice: Subject to any disclaimer, the term of this patent is extended or adjusted under 35 U.S.C. 154(b) by 1412 days.

(21) Appl. No.: 11/257,293

(22) Filed: Oct. 24, 2005

(51) Int. Cl.
*H01M 4/00* (2006.01)

(52) U.S. Cl. ................... 429/231.95; 429/231.3

(58) Field of Classification Search .............. 429/218.1, 429/231.95, 231.3, 231.5, 231.6, 231.8, 223, 429/224, 229, 231.2; 423/594, 223
See application file for complete search history.

(56) References Cited

U.S. PATENT DOCUMENTS 5,955,051 A * 9/1999 Li et al. ................... 423/594.4

* cited by examiner

*Primary Examiner*—Jennifer Michener
*Assistant Examiner*—Monique Wills
(74) *Attorney, Agent, or Firm*—John Lezdey

(57) ABSTRACT

There is provided a process for preparing lithium cobaltate and to lithium-containing cobalt oxides which is used in lithium battery cathodes. Also, there is provided cathodes for lithium batteries.

14 Claims, No Drawings

PROCESS FOR PREPARING LITHIUM ION CATHODE MATERIAL

FIELD OF THE INVENTION

The present invention relates to the preparation of lithium-containing cobalt oxide ($LiCoO_2$) which is referred to as "lithium cobaltate" and to lithium-containing cobalt oxide for use in positive electrodes of non-aqueous lithium cells and batteries.

BACKGROUND OF THE INVENTION

Lithium based batteries are used in a variety of applications, such as videotape recorders, communications devices and many portable devices. Generally, the lithium battery industry has employed $LiCoO_2$-type material as the active component of lithium battery cathodes. However, $LiCoO_2$ lithium battery cathodes are typically expensive. Moreover, lithium-containing transition metal oxides such as $LiCoO_2$ suffer a problem that they have low thermal stability in the charged state when in contact with an organic electrolyte. Since $LiCoO_2$ consists of platy particles, the particles tend to show high orientation, and in case where there is high or increased bulk density, the $LiCoO_2$ particles become oriented in parallel with the collector. This leads not only in a decrease in the penetration of the electrolyte but also in hindrance in maintaining the presence of crystallographic planes through which occlusion and discharge of lithium ions takes place. Accordingly, $LiCoO_2$ had problems of decreasing capacity characteristics such as high rate discharge properties in case of increasing bulk density of the electrode.

$LiCoO_2$ expands on charging and contract on discharging or deintercalating. However, other lithium-containing transition metal oxides with a spinel type structure contract on charging and expand on deintercalating. By using a mixture of these transition metal oxides there is an improvement in thermal stability and capacity.

Currently, the preferred way to make $LiCoO_2$ is by running the following reaction up to 900° C. in two steps:

$$Li_2CO_3 + \tfrac{2}{3}Co_3O_4 \rightarrow 2LiCoO_2 + CO_2$$

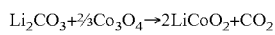

The lithium carbonate sinters badly at about 500-600° C. and the sintered partially reacted mixture is ground at this point. The mixture is again placed back in the furnace and then heated to 900° C. for six or more hours. The powder is again milled, screened and then packaged. This process is labor intensive, slow and expensive.

U.S. Pat. No. 6,790,560 to Wakihara, which is herein incorporated by reference, discloses a lithium manganese oxide that has a spinel structure having a metallic element other than Li and Mn which is Ni, Al, Cr or Mg that is prepared with three heating steps including under controlled oxygen, partial pressure and quenching.

U.S. Pat. No. 6,818,315 to Sernagawa et al which is herein incorporated by reference, discloses the preparation of a cathode which can be used with the present invention. However, the cathode active components are a mixture of $LiCoO_2$ and spinel type lithium manganate.

U.S. Pat. No. 6,872,491 to Kanai et al, which is herein incorporated by reference, discloses the preparation of cathodes for lithium ion secondary batteries. There is disclosed that lithium batteries using lithium manganese composite oxide are unstable at high temperatures. Also, the crystal structure of $LiNiO_2$ is unstable at higher temperatures. There is also disclosed a process of preparing cathodes which can be used in the present invention.

U.S. Pat. No. 6,818,351 to Sernagawa et al which is herein incorporated by reference discloses the preparation of lithium secondary battery cathodes with spinel type lithium manganese oxide and lithium containing cobalt oxide.

U.S. Pat. No. 6,855,461 to Lampe-Onnerod which is herein incorporated by reference, discloses the preparation of lithium battery cathodes with lithium oxide compositions containing an element selected from aluminum, gallium, magnesium, vanadium, titanium and zirconium.

SUMMARY OF THE INVENTION

According to the present invention there is prepared lithium metal oxide and lithium metal mixed oxides having the general formula:

$$LiMxKyCo_zO_2$$

Wherein K and M are nickel, manganese, vanadium, aluminum or chromium and different from each other, utilizing a similar process according to the following equation:

$$2LiOH + 2Co(OH)_2 + \tfrac{1}{2}O_2 \rightarrow 2LiCoO_2 + 3H_2O$$

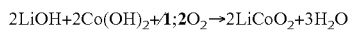

Alternatively, an oxide of cobalt can be used such as $Co_3O_4$ and CoO.

All of the metal hydroxides and oxides in the reaction are oxidized to their more stable oxidization level while preserving the fine particle size of the original metal oxide or hydroxide by use of lower furnacing temperatures.

More particularly, there is provided a process for preparing lithium oxide spinels of the empirical formula:

$$LiMxKyCo_zO_2$$

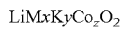

Wherein M is an element selected from the group consisting of nickel, manganese, chromium, vanadium and aluminum, K is an element selected from the group consisting of nickel, manganese, chromium, vanadium and aluminum and is other than M, x is 0 to 1 y is 0 to 0.8 and z is >0 to 1 and x+y+z=0.9-1.1

It is a general object of the invention to prepare lithium metal oxides for use as cathode material for secondary batteries.

It is also an object of the invention to prepare lithium metal oxides.

It is another object of the invention to prepare lithium cobaltate.

It is yet another object of the invention to prepare lithium metal oxide spinels with cobalt present as separate phase or concentrated on the surface of the lithium metal oxide particles coated on the surface.

In accordance with another embodiment of the invention a process for preparing lithium cobaltate which comprises reacting a compound selected from the group consisting of cobalt oxides and cobalt hydroxide with lithium hydroxide monohydrate in water in $CO_2$ free atmosphere at a temperature between about 100 to 140° C. to remove water, and then heating between about 700 to 900° C. in oxygen containing atmosphere preferably substantially free of $CO_2$.

DESCRIPTION OF THE PREFERRED EMBODIMENTS

According to the present invention, lithium metal oxides for lithium battery cathodes are prepared with lithium hydroxide or oxide and subsequently with metal hydroxides and oxides which are oxidized to their most stable oxidation levels at 700-900° C. For example, cobalt and manganese are oxidized from +2 to +3. This ready oxidation of the meal oxides or hydroxides allows for lower processing costs and more readily available starting materials.

According to one embodiment of the invention there is provided a process for preparing lithium metal oxides of the empirical formula:

$$LiM_xK_yCo_zO_2$$

wherein M is an element selected from the group consisting of nickel, manganese, chromium, vanadium and aluminum, wherein K is an element selected from the group consisting of nickel, vanadium, manganese, aluminum and chromium and is other than M, wherein x is 0 to 1, y is 0 to 0.8, z is >0 to 1 z+x+y=0.9 to 1.1 consisting of the steps of
   a) mixing the desired stoichiometric amount of cobalt oxide or hydroxide, lithium hydroxide monohydrate and an oxide or hydroxide of an element selected from the group consisting of nickel, manganese, vanadium, aluminum, chromium or a mixture thereof, in the presence of water, preferably in a substantially $CO_2$ free atmosphere,
   b) heating the mixture of part a) with stirring to about 100 to 250° C. to drive off water,
   c) heating the material from part b) to about 700 to 950° C. for about 2 to 6 hours, and then
   d) grinding the material from part c) to a particle size below 20 microns.

In accordance with another embodiment of the invention, lithium cobaltate is prepared by reacting a compound selected from the group consisting of cobalt oxide and cobalt hydroxide with lithium hydroxide monohydrate in water in a substantially $CO_2$ free atmosphere at a temperature between about 100 to 140° C. to remove water and then heating between about 700 to 850° C.

Alternatively, when the temperature of the aqueous slurry has hit 100° C., vacuum is applied and the mixture allowed to be heated up to 100-140° C. with stirring to permit grinding to continue. After the material is dry, it is cooled and screened. The oversize particles are ground to at least –40 mesh and combined. This powder is placed in the furnace and heated to about 800-850° C. for three hours under oxygen containing atmosphere. The powder is cooled and ground to the desired size (<20 mesh).

Although lithium hydroxide monohydrate has been used in the prior art, it usually causes too much sintering in the furnace and is difficult to handle in general. Often it is used in excess with the oxides and dry roasted or furnaced. It has been found that using a concentrated aqueous slurry containing only the stoichiometric amount of LiOH and the stoichiometric amount of the component metal oxide or mixed metal oxides or preferably the metal hydroxides such as cobalt (II) hydroxide and heating with agitation to drive off the free water produces a powder or dry cake. Preferably the drying and heating of this powder to above 120° C. with vacuum or 120° C. with no vacuum to produce a dry powder which has the composition the desired product plus the anhydrous LiOH (no water of hydration left). The LiOH has already partially reacted with the cobalt compound. This powder is screened or optionally ground and screened and then placed in a furnace (batch or continous or rotary) and heated up to 700-850° C. for 2.5 to 4 hours (preferably 3 hours). The atmosphere of the furnace can be dry carbon dioxide-free air or oxygen. The bed is kept less than ¾ inch thick if stationary. It has been found that the cobalt (II) oxidizes rapidly under these conditions and produces the desired lithium cobaltate as demonstrated by x-ray diffraction. The lightly sintered product is cooled under dry air (no $CO_2$ or water vapor) or oxygen and then readily ground to the desired battery grade material for lithium-ion batteries.

Testing in prismatic lithium-ion cells has shown that this material has higher capacity (145 mAh/g) than the currently available commercial lithium cobaltate materials (125-140 mAh/g). The charge/discharge cycling of this lithium cobaltate demonstrates that it is more stable on repeated cycling than the currently available commercial lithium cobaltate.

Various other transition metal oxides or nitrates can be added as additives during the initial step with the lithium hydroxide monohydrate to form hydroxide coatings or separate phases on the final lithium metal oxide cathode material. These additives may be added as the nitrates, carboxylates, oxalates, acetates, hydroxides or oxides up to 10%. These additives, mixed oxides and hydroxides lead to an increase in capacity.

Electrodes and, further, batteries may be manufactured by using the thus obtained lithium metal oxides as cathode material (active material). For example, one example of the battery is a lithium secondary battery having a cathode, an anode and an electrolyte. To be specific, there may be illustrated a secondary battery in which an electrolyte exists between a cathode and an anode and a separator is provided between the cathode and the anode to prevent them from contacting with each other.

The cathode contains the lithium metal oxides of the invention (cathode material) and a binder. It may further contain, if necessary, a conductive matrix. The cathode may be obtained by mixing a mixture of the above-described materials with a definite amount of a solvent for uniformly dispersing them to thereby prepare a coating mixture, and then applying it onto a current collector, followed by drying. As the conductive matrix to be used here, there may be illustrated natural graphite, artificial graphite and acetylene black. As the binder, there may be illustrated polyvinylidene fluoride, polytetrafluoroethylene, polyvinyl acetate, polymethyl methacrylate, polyethylene and nitrocellulose. Further, as the dispersing solvent, there may be illustrated N-methylpyrrolidone, tetrahydrofuran, dimethylformamide, and acetone.

The following examples are illustrative of the invention.

Example 1

Preparation of Lithium Cobaltate ($LiCoO_2$) from Cobalt (II) Hydroxide 289.7 g cobalt (II) hydroxide (2.96 moles, 95% high purity) was added to 410 distilled water in a SS (SS=stainless steel container) stirred mixing bowl with slow stirring under a slow purge of $CO_2$ free air (or nitrogen) to blanket the slurry. 125 g lithium hydroxide monohydrate (2.96 moles) was added and heated as rapidly as possible with continued agitation. The slurry became a powder when the temperature was raised above 100° C. The temperature was allowed to rise while the lumps are ground to a fine dry powder. The temperature reached about 120-140° C. This powder was screened through –40 mesh and the oversize material was ground and recombined with the rest. The powder was optionally dried in a vacuum desiccator at 150-200° C. The dry powder which has the approximate composition of LiOH/CoO$_x$ was then placed in a Hastalloy tray and heated at 850° C. for three hours with a slow purge of air over it. The lithium cobaltate was removed and allowed to cool while protected from $CO_2$ and moisture. The product weighed 220 g after ball milling. XRD showed it to be high purity LiCoO$_2$ with a tap density of 2.53 and with the Li/Co ratio of 1.03. Testing in a lithium-ion cell resulted in over 300 cycles at C/2 discharge rate at 100% depth of discharge resulting in only 30% loss. The capacity was 145 mAh/g.

Example 2

Preparation of Lithium Cobaltate (LiCoO$_2$) from Cobalt Oxide (Co$_3$O$_4$)

955 g cobalt oxide (Co$_3$O$_4$) (3.97 moles) was added to 1500 g distilled water in a SS (SS=stainless steel container) stirred mixing bowl with slow stirring under a slow purge of $CO_2$ free air (or nitrogen) to blanket the slurry. 500 g lithium hydroxide monohydrate (11.9 moles) was added and the slurry heated as rapidly as possible. As the stirred slurry became a powder, the temperature was allowed to rise to 120° C. This powder (1252 g) was screened through –40 mesh and the oversized ground and recombined with the rest. The powder was further dried in a vacuum desiccator at 155° C. 355 g of the dry powder which has the approximate composition of LiOH/CoO$_2$ was then placed in a Hastalloy tray and heated at 850° C. for three hours with a slow purge of air over it. The lithium cobaltate was removed and allowed to cool while protected from $CO_2$ and moisture. The product was balled milled. XRD showed it to be high purity LiCoO$_2$ with a tap density of 2.40 and with the Li/Co ratio of 1.05. Testing in a lithium-ion cell resulted in equivalent good performance as with Example 1 when the hydroxide was used as the starting material.

Example 3

Preparation of Lithium Cobaltate (LiCoO$_2$) from Cobalt (II) Hydroxide with Chromic Oxide Additive 250 g cobalt (II) hydroxide (95%, 2.55 moles) was added to 400 g distilled water in a SS (SS=stainless steel container) stirred mixing bowl and with slow stirring under a slow purge of $CO_2$ free air to blanket the slurry, then 49 g Cr(NO$_3$)$_3$ 9H$_2$O (0.122 moles) in 125 g distilled water was added. 109 g lithium hydroxide monohydrate (2.60 moles) was added and then heated as rapidly as possible. The slurry became a powder and the temperature was allowed to rise to 112° C. This powder was screened through –40 mesh and the oversized ground and recombined with the rest. The powder was further dried in a vacuum desiccator at 200° C. The dry powder which has the approximate composition of LiOH/CoO$_2$ was then placed in a Hastalloy tray and heated at 800° C. for three hours with a slow purge of air over it. The lithium cobaltate (2% Cr) was removed and allowed to cool while protected from $CO_2$ and moisture. The product was balled milled. Testing in a lithium-ion cell showed it to cycle well at C/2 discharge rate at 100% depth of discharge and was equivalent to standard lithium cobaltate in performance.

Example 4

Preparation of Mixed Lithium 0.2 Cobaltate/0.8 Nickelate (LiCo$_{0.2}$Ni$_{0.8}$O$_2$) from Cobalt (II) Hydroxide and Nickel (II) Hydroxide 300 g Ni(OH)$_2$ (61% nickel) (3.12 moles) was added to 400 g distilled water and then there was added 76.3 g cobalt (II) hydroxide (95%, 0.78 moles) into a SS (SS=stainless steel container) stirred mixing bowl with slow stirring under a slow purge of $CO_2$ free air to blanket the slurry. 163.8 g lithium hydroxide monohydrate (3.90 moles) was added and heated as rapidly as possible. The stirred slurry became a powder and the temperature eventually rose to 120-140° C. This powder was screened through –40 mesh and the oversized ground and recombined with the rest. The powder was further dried in a vacuum desiccator at 150° C. The dry powder was then placed in a Hastalloy tray and heated at 800° C. for three hours with a slow purge of air over it. The lithium nickelate/cobaltate was removed and allowed to cool while protected from $CO_2$ and moisture. No sintering was observed, even though the ramp up was rapid, 2 hours. The product was ball milled. Testing in a lithium-ion cell showed that the material cycled well but showed an initial 20% irreversible loss at C/2 discharge rate at 100% depth of discharge.

Example 5

Preparation of Mixed Lithium 0.4 Cobaltate/0.6 Nickelate (LiCo$_{0.4}$Ni$_{0.6}$O$_2$) from Cobalt (II) Hydroxide and Nickel (II) Hydroxide 176 g Ni(OH)$_2$ (67% nickel) (1.90 moles) was added to 500 g distilled water, and then there was added 122 g cobalt (II) hydroxide (95%, 1.25 moles) into a SS (SS=stainless steel container) stirred mixing bowl with slow stirring under a slow purge of $CO_2$ free air to blanket the slurry. 126 g lithium hydroxide monohydrate (2.98 moles) was added and the mixture was heated as rapidly as possible. The stirred slurry became a powder and the temperature was allowed to rise to 125° C. This powder was screened through –40 mesh and the oversized ground and recombined with the rest. The powder was further dried in a vacuum desiccator at 150° C. The dry powder was then placed in a Hastalloy tray and heated at 800° C. for three hours with a slow purge of air over it. The lithium nickelate/cobaltate was removed and allowed to cool while protected from $CO_2$ and moisture. No sintering was observed, even though the ramp up was rapid, 2 hours. The product lost about 14% by weight during furnacing. The product was ball milled. Testing in a lithium-ion cell showed that in material cycled very well at C/2 discharge rate at 100% depth of discharge with high capacity retention.

Analyses showed that the ratio of Ni/Co was 59.6/40.4, essentially the calculated ratio. Tap density was 2.34 g/cc. The XRD was also as expected for a mixture of the lithium nickelate and cobaltate.

Example 6

Preparation of Mixed Lithium 0.2 Cobaltate/0.6 Nickelate/0.2 Manganate (LiCo$_{0.2}$Ni$_{0.6}$Mn$_{0.2}$O$_2$) from Cobalt (II) Hydroxide Nickel (II) Hydroxide and Manganese (III) Oxide 176 g Ni(OH)$_2$ (61% nickel) (1.90 moles) was added to 400 g distilled water and then was added 61.0 g cobalt (II) hydroxide (95%, 0.63 moles) into a SS (SS=stainless steel container)

stirred mixing bowl with slow stirring under a slow purge of nitrogen to blanket the slurry and then there was added 50.6 g $Mn_2O_3$ (0.32 moles). After this 133 g lithium hydroxide monohydrate (3.17 moles) was added and the mixture heated as rapidly as possible with stirring. The stirred slurry became a powder and the temperature was allowed to rise to 120-140° C. This powder was screened trough −40 mesh and the oversized ground and recombined with the rest. The powder was further dried in a vacuum desiccator at 150° C. The dry powder was then placed in a Hastalloy tray and heated at 750° C. for three hours with a slow purge of air over it. The lithium nickelate/cobaltate/manganate was removed and allowed to cool while protected from $CO_2$ and moisture. No sintering was observed, even through the ramp up was rapid, 2 hours. The product was ball milled. Testing in a lithium-ion cell showed that in material cycled very well at C/2 discharge rate at 100% depth of discharge.

What is claimed is:

1. A process for preparing lithium metal oxide of the empirical formula:

$$LiM_xK_yCo_zO_2$$

Wherein M is an element selected from the group consisting of nickel, manganese, chromium, vanadium and aluminum, wherein K is an element selected from the group consisting of nickel, vanadium, manganese, aluminum and chromium and is other than M, wherein x is 0 to 1 y is 0 to 0.8 and z is >0 to 1, and z+x+y=0.9 to 1.1 consisting of the steps of:

a) mixing the desired stoichiometric amount of cobalt oxide or hydroxide, lithium hydroxide monohydrate and the oxides or hydroxides of a element selected from the group consisting of nickel, manganese, vanadium, aluminum, chromium or a mixture thereof, in the presence of water and low $CO_2$ atmosphere, b) heating the mixture of part a) with stirring to about 100 to 250° C. to drive off water; and then c) heating the material from part b) to about 700 to 950° C. for about 2 to 6 hours.

2. The process of claim 1 including the step of:

a) grinding the material from part c) to a particle size of not more than 100 microns.

3. The process of claim 1 wherein the step of part b) is under vacuum.

4. The process of claim 1 wherein manganese oxide is mixed with lithium hydroxide monohydrate and cobalt hydroxide in part a).

5. The process of claim 1 wherein nickel hydroxide and cobalt hydroxide is mixed with lithium hydroxide monohydrate and $LiCO_{0.4}Ni_{0.6}O_2$ is prepared.

6. The process of claim 1 wherein lithium metal oxide is a spinel coated on the surface with cobalt or chromium.

7. The process of claim 5 wherein said lithium metal oxide is $LiCO_{0.05}Ni_{0.95}O_2$.

8. The process of claim 1 wherein M is nickel and K is manganese.

9. The process of claim 1 including a dopant.

10. A process for preparing lithium cobaltate which comprises reacting a compound selected from the group consisting of cobalt oxide and cobalt hydroxide with lithium hydroxide monohydrate in water in low $CO_2$ atmosphere at a temperature between about 100 to 140° C. to remove water, and then heating between about 700 to 900° C.

11. The process of claim 10 wherein the water is removed under vacuum.

12. The process of claim 11 wherein the vacuum is applied at 100° C.

13. The process of claim 10 wherein a stoichiometric amount of lithium hydroxide monohydrate is used.

14. The process of claim 10 wherein the heating between 200 to 900° C. is for 2.5 to 4 hours.

* * * * *